Figure 1:
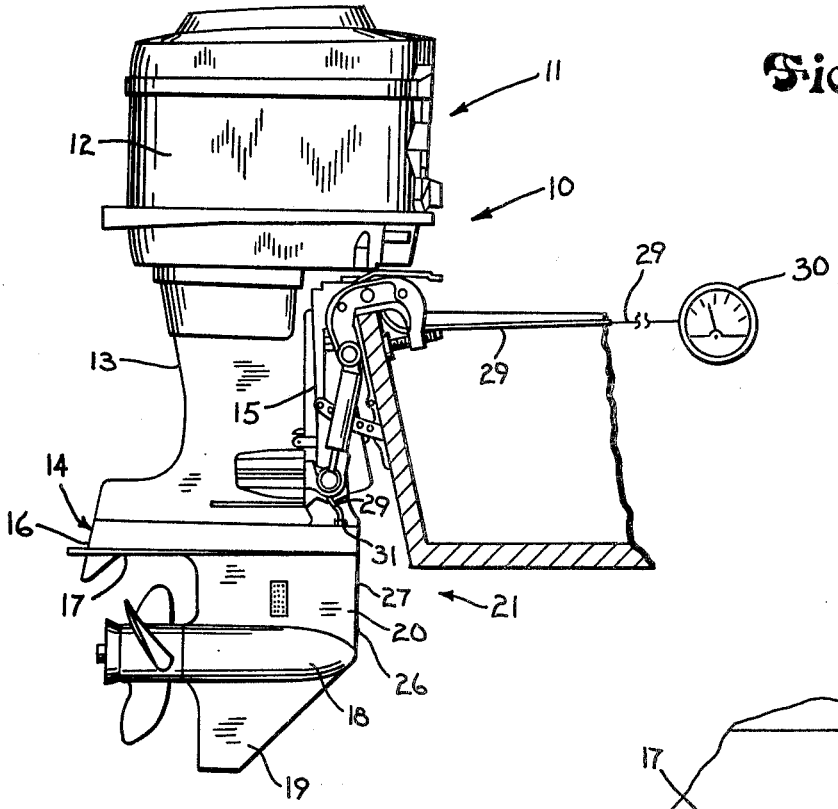
Figure 2:
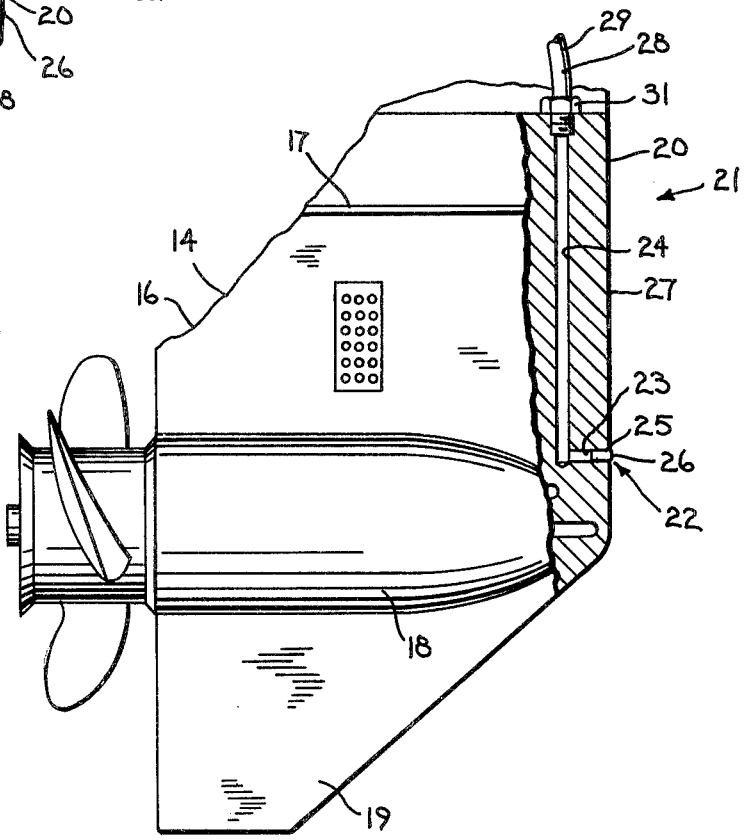

United States Defensive Publication [19] (H) [11] T981,002

Snyder [43] Apr. 3, 1979

[54] MARINE PROPULSION UNIT WITH WATER SPEED MEASUREMENT MEANS

[75] Inventor: Richard H. Snyder, Oshkosh, Wis.

[73] Assignee: Brunswick Corporation, Skokie, Ill.

[21] Appl. No.: 879,750

[22] Filed: Feb. 21, 1978

[51] Int. Cl.[2] ..... G01P 5/16; G01F 1/46

[52] U.S. Cl. ..... 73/182

[57] ABSTRACT

A marine propulsion drive unit which includes a speed measurement indicator. The speed measurement indicator is operatively connected to a pitot tube 22 within the lower gear unit 14 of the marine propulsion drive. The opening of the pitot tube 22 being in the leading edge 27 of the lower gear unit 14 at an elevation below the cavitation plate 17. This opening is formed by a blind horizontal passageway 23 extending from the leading edge 27. The horizontal passageway 23 intersects a blind vertical passageway 24 which is connected by tubing 29 to the speed measurement indicator.

8 Claims, 1 Sheet Drawing,

8 Pages Specification

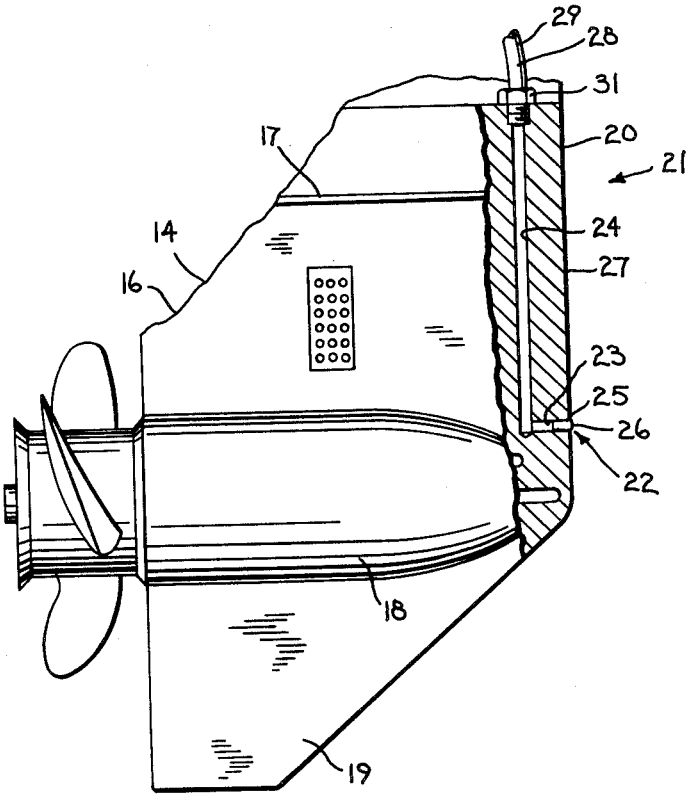

The file of this unexamined application may be inspected and copies thereof may be purchased (849 O.G. 1221, Apr. 9, 1968).